(12) United States Patent
Gradischnig

(10) Patent No.: US 6,745,361 B1
(45) Date of Patent: Jun. 1, 2004

(54) METHOD FOR CONTROLLING THE MESSAGE FLOW IN A COMMUNICATION NETWORK

(75) Inventor: Klaus Gradischnig, Gauting (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/674,944

(22) PCT Filed: May 4, 1999

(86) PCT No.: PCT/EP99/03049

§ 371 (c)(1),
(2), (4) Date: Nov. 7, 2000

(87) PCT Pub. No.: WO99/59299

PCT Pub. Date: Nov. 18, 1999

(30) Foreign Application Priority Data

May 8, 1998 (DE) .......................... 198 20 738

(51) Int. Cl.[7] .............................. H04L 1/18; H04L 1/14
(52) U.S. Cl. ...................... 714/749; 714/750; 370/235
(58) Field of Search ................ 714/748, 749, 714/750; 370/231, 235

(56) References Cited

U.S. PATENT DOCUMENTS

| | | | |
|---|---|---|---|
| 4,677,616 A | | 6/1987 | Franklin |
| 4,736,369 A | * | 4/1988 | Barzilai et al. ............. 370/231 |
| 4,841,526 A | * | 6/1989 | Wilson et al. ............. 714/748 |
| 5,063,562 A | * | 11/1991 | Barzilai et al. ............. 370/231 |
| 5,163,046 A | * | 11/1992 | Hahne et al. ............. 370/237 |
| 5,517,622 A | * | 5/1996 | Ivanoff et al. ............. 709/232 |

FOREIGN PATENT DOCUMENTS

| | | | |
|---|---|---|---|
| EP | 0 820 209 A2 | 1/1998 | |
| WO | WO 9636150 A1 | * 11/1996 | ........... H04L/12/56 |

OTHER PUBLICATIONS

Jae K. Song et al: An Algorithm For Flow And Rate Control of XTP—Proceedings of the International Conference on Communications (ICC), Geneva, May 23–26, 1993, vol. 1, May 23, 1993 pp. 187–191.

A Taxonomy for Congestion Control Algorithms in Packet Switching Networks, Yang et al P. 34–45—IEEE Network Jul.;/Aug. 1995, No. 4.

Black U D: XP–002117—The SSCOP Operations in More Detail p. 79–89.

* cited by examiner

*Primary Examiner*—Albert Decady
*Assistant Examiner*—Joseph D. Torres
(74) *Attorney, Agent, or Firm*—Neifeld IP Law, PC

(57) ABSTRACT

Many communication protocols require a control circulation between transmitter and receiver such that the receiver is capable of controlling the transmission rate of the transmitter. This is frequently accomplished by communicating a transmission window. Inventively, the transmitter is informed of the currently desired transmission window even without the presence of message losses and without an explicit request on the part of the transmitter.

10 Claims, 6 Drawing Sheets

Enhanced credit updating

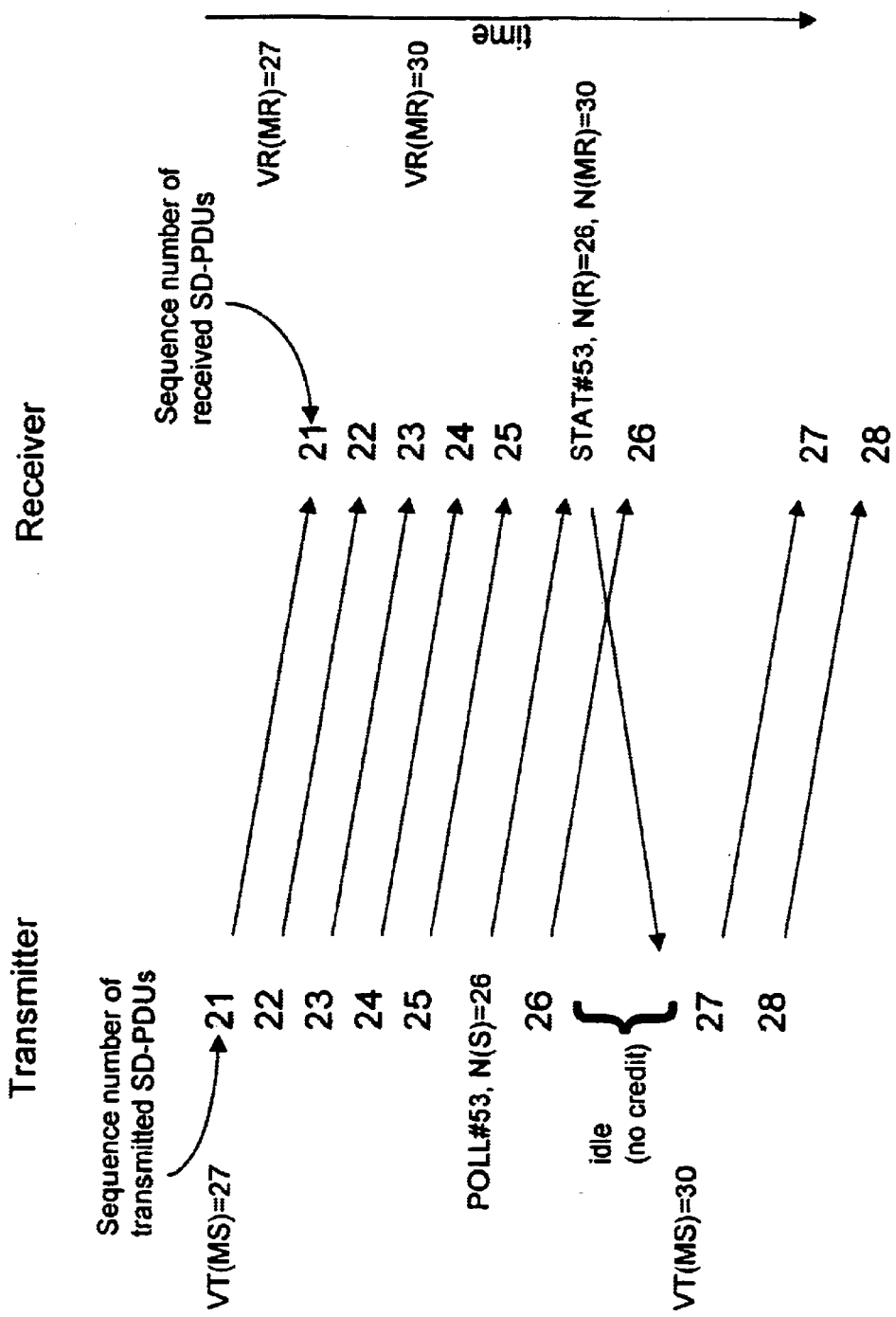
Figure 1 - Credit updating in Q.2110

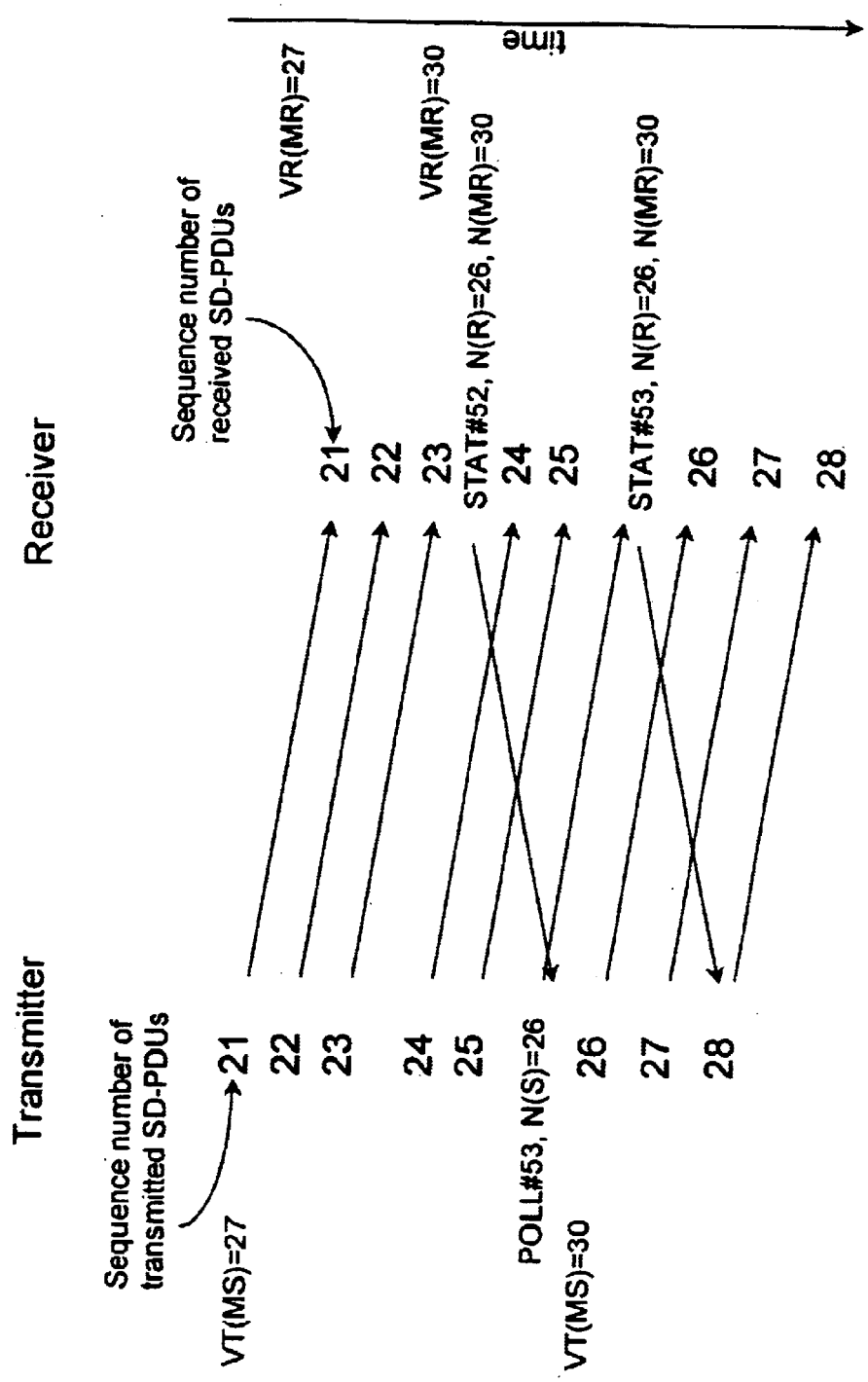
Figure 2 - Enhanced credit updating

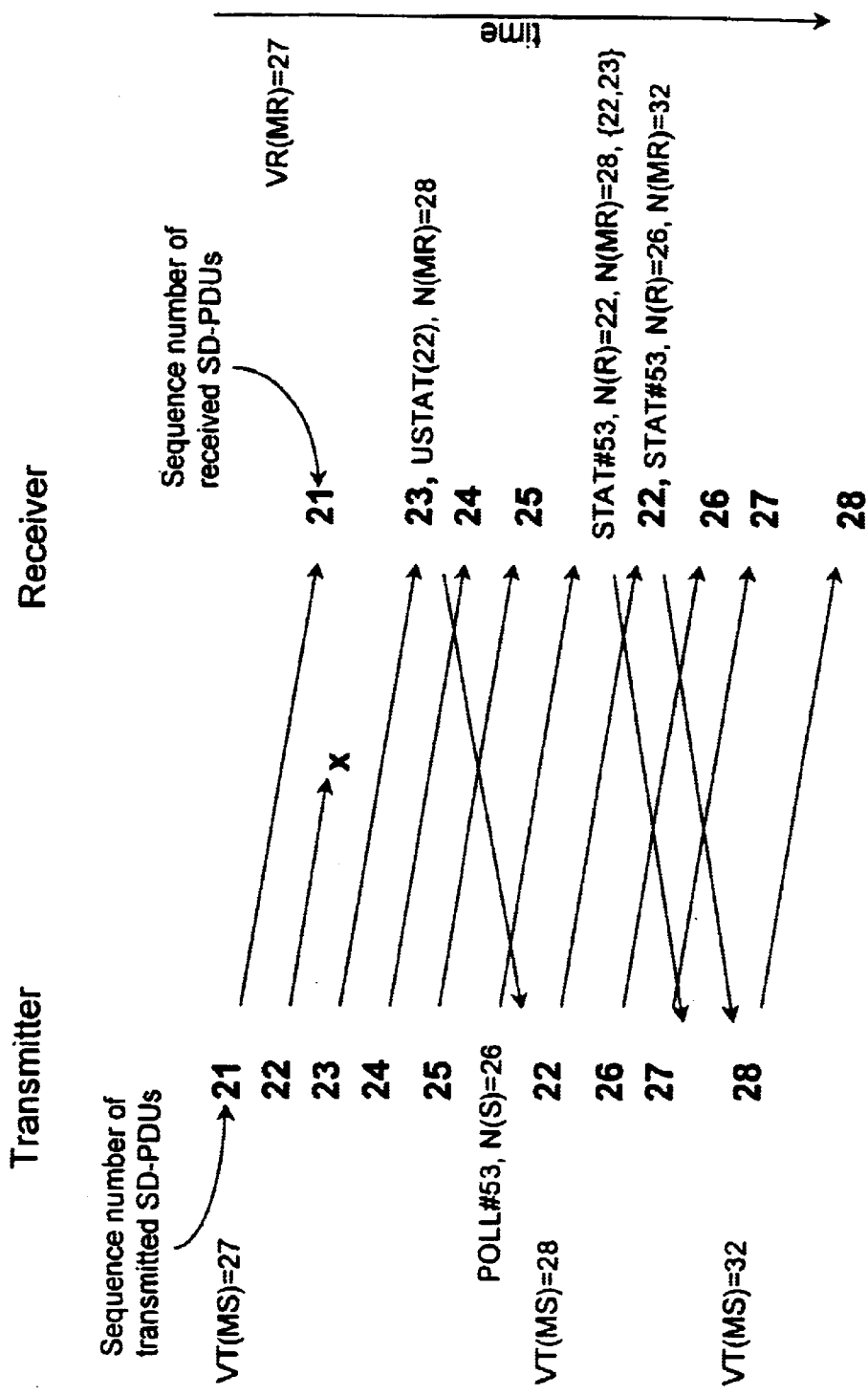
Figure 3 - STAT transmission after gap closure

Modification to SCCOP to call credit verification algorithm

Credit verification and update algorithm

Example application of credit verification and update algorithm of Fig. 4B

METHOD FOR CONTROLLING THE MESSAGE FLOW IN A COMMUNICATION NETWORK

The document, "AN Algorithm for Flow Rate Control of XTP" by Jae K Song et al. (Proceeding of the International Conference on Communications (ICC), Geneva, May 23–26, 1993, Vol. 1 Engineers, May 23, 1993, pages 187–191, Institute of Elewctrical [sic] and Electornics [sic] Eingneers [sic], ISBN 0-7803-0950-2) discloses various methods for controlling the message flow.

Many communication protocols require a control circulation between transmitters and receivers such that the receiver is capable of controlling the transmission rate of the transmitter. This is often accomplished by explicit or implicit definition of a transmission window, whereby the transmitter is only allowed to have a specific plurality of non-acknowledged messages pending.

Specifically when the receiver can dynamically define the size of the window, this is thereby also called assigning credit by the receiver, i.e. the credit defines the upper limit of the transmission window. The receiver uses the assigning of credit to control the transmission stream according to the resources available to it, including the available reception buffers.

At least one protocol (Q.2110) that has already been defined uses the same messages for assigning credit that are also used for positive or, respectively, negative acknowledge. When, further, point in time and frequency of the acknowledgments are essentially controlled by the transmitter in such a method (as, for example, in Q.2110 where an acknowledgment only ensues on the basis of a prior request by the transmitter (exception: upon recognition of message losses, a negative acknowledgment is spontaneously sent by the receiver in Q.2110, i.e. without a request)), then the point in time and frequency of the modifications of the transmission window are also defined by the transmitter. This, however, runs essentially counter to the assumption that the control Substitute Page of the transmission window ensues by the receiver dependent on the resources available to it.

The mechanism for flow control explained above for the protocol Q.2110 is also known from the document, "ATM Volume II" Signaling in Broadband Networks, l/e' by U. D. Black "August 1997, Prentice Hall PTR, United states)".

Due to said control by the transmitter, situations arise wherein the receiver can communicate a modification of the transmission window to the transmitter only after arrival of a corresponding (credit) request and not immediately after the occurrence of the modification. The disadvantages that arise are two-fold. First, fundamentally avoidable blockings of the message flow can occur due to delayed assigning of credit. On the other hand, an avoidable load on the receiver can occur due to the delayed credit reduction, as a result whereof, for example, message loss on other links and/or other connections that are controlled by the same reception means (receiving station) can occur.

The invention is based on the object of avoiding said disadvantages.

This object is achieved by a method according to claim 1.

The invention is described in greater detail below.

Inventively, the transmitter is informed of the currently desired transmission window even without a presence of message losses and without an explicit request by the transmitter (as, for example, with a POLL-PDU in Q.2110). This measure is applied in order to counter, on the one hand, blockings of the message flow and, on the other hand, overloads of the receiving station.

Specifically, this measure can be achieved, for example in Q.2110, in that, given necessary changes of the reception window, the receiver informs the transmitter thereof by a spontaneous transmission of what is referred to as a STAT-PDU. Another reason for an advantageous, spontaneous transmission of a STAT-PDU can, for example, also be comprised in spontaneously acknowledging (confirming) messages for the transmitter without having to wait for a request.

A particular advantage of the invention is to be seen therein that, even though it is not provided in Q.2110, a STAT-PDU can also be spontaneously transmitted by the receiver without a protocol infringement of Q.2110 thereby occurring at the transmitter. By applying the invention given Q.2110, thus, the above-described disadvantages are avoided without having to violate the protocol of Q.2110.

The application of the invention given Q.2110 is explained in brief below.

When the case of a desired change of the transmission window occurs, the receiver spontaneously transmits a STAT-PDU with the modified transmission window. Cases of a desired change are present, for example, when the current capacity of the reception buffer and/or the plurality of payload messages that a transmitter is still allowed to transmit unacknowledged for a connection falls below a specific value.

Further, a spontaneous STAT-PDU is sent when a gap in the reception buffer is closed by reception of a SD-PDU. As a result thereof, a possible blocking of the message flow is likewise opposed. Reception gaps are thereby not communicated. As usual, N(R) is occupied with the current value con VR(R). The POLL sequence number N(PS) is set to the value of the most recently received POLL-PDU (or, respectively, to 0 if a POLL_PDU has not yet been received). For easier administration, an additional receiver status variable VR(PS) can be introduced, this being initialized with 0 and being stored in the N(PS) of a received POLL-PDU.

The credit updating mechanism according to Q.2110 as well as according to the invention is explained again below by way of example on the basis of FIGS. 1 through 4.

FIG. 1 show the principle of the credit updating mechanism according to Q.2110 in the form of an arrow diagram, whereby the arrows represent the transmitted or, respectively, received PDUs.

When the transmission begins with the SP-PDU 21, the transmitter has a previously received credit (for example, via a previously received STAT-PDU) for the transmission of SD-PDUs up to SP-PDU 26, inclusive, i.e. the status variable VT(MS) of the transmitter has the value 27.

After the receiver has received the SD-PDU 23, it finds that it can now extend the credit up to and including SD-PDU 29, i.e. it sets its status variable VR(MR) to the value 30. According to Q.2110, however, it cannot inform the transmitter of what is now the extended credit at this point in time.

Only after the POLL-PDU#53 that is sent following the SD-PDU 25 has reached the receiver can the receiver reply thereto with a STAT-PDU having the number 53, whereby this STAT-PDU contains the new credit value 30 in the new PDU parameter N(MR). In the meantime, the transmitter that has sent the SD-PDU 26 must suspend the transmission of further SD-PDUs until it receives a further credit.

The transmitter can only continue with the transmission of SD-PDUs after it has received the STAT-PDU#53 that contains a further credit.

FIG. 2 shows the principal of the inventive credit updating mechanism by way of example, again in the form of an arrow diagram wherein the arrows represent the transmitted or, respectively, received PDUs.

When the transmission begins with the SD-PDU 21, the transmitter has a previously received credit (for example, via an earlier STAT-PDU) for transmitting SD-PDUs up to sequence number 26, inclusive, i.e. the transmitter status variable VT(MS) has the value 27.

After the receiver has received the SD-PDU 23, it finds that it can now extend the credit up to SD-PDU 29, inclusive, i.e. it sets its receiver status variable to the value 30. Moreover, it informs the transmitter of the expanded credit with the assistance of a STAT-PDU having the number 52, i.e. the number of the previously received POLL-PDU, namely without waiting for another POLL-PDU that could serve as trigger for sending a STAT-PDU.

The transmitter will thus still be informed about the expanded credit timely enough that it need not suspend the transmission.

FIG. 3 shows an example of the credit updating mechanism after the closing of a gap in the reception buffer, namely again in the form of an arrow diagram wherein the arrows represent the transmitted or, respectively, received PDUs.

The receiver makes the reception buffer available for six SD-PDUs and expands the credit according to this existing reception capacity. Whenever three SD-PDUs were received in sequence and delivered to the SSCOP user, the receiver additionally assigns the transmitter a credit of three, which again restores the total credit of six. When, however, a SD-PDU has been lost and must be re-transmitted, reception buffers remain occupied for a longer time and thereby delay the possibility for granting a new credit.

When the transmission begins with the SD-PDU 21, the transmitter has a previously received credit (for example, via a previously received STAT-PDU) for sending PDUs up to sequence number 26, i.e. the status variable VT(MS) of the transmitter has the value 27.

After the SD-PDU was received, the receiver finds that it has lost the SD-PDU 22. According to Q.2110, it communicates the fact to the transmitter with the assistance of a USTAT-PDU and simultaneously expands the credit by one SD-PDU, i.e. up to the sequence number 28, since it has already delivered the SD-PDU 21 to the user at this point in time.

As soon as the POLL#53 has been received, an additional credit cannot be granted in the STAT-PDU returned in response thereto, since the SD-PDU 22 has still not arrived. The STAT#53, however, informs the transmitter of the gap (22, 23).

As soon as the re-transmitted SD-PDU 22 has been correctly received, the SD-PDUs 22 through 25 can be delivered to the SSCOP user, and the reception buffer is thus again available for six SD-PDUs, i.e. the credit can thus be expanded to the sequence number 32. To this end, the receiver immediately informs the transmitter of the expanded credit with the assistance of a STAT-PDU having the sequence number 53, i.e. the number of the POLL-PDU that was already received and replied to earlier, without waiting for a further POLL-PDU for which it would usually have to wait as trigger for the transmission of a STAT-PDU.

Figure 4A:
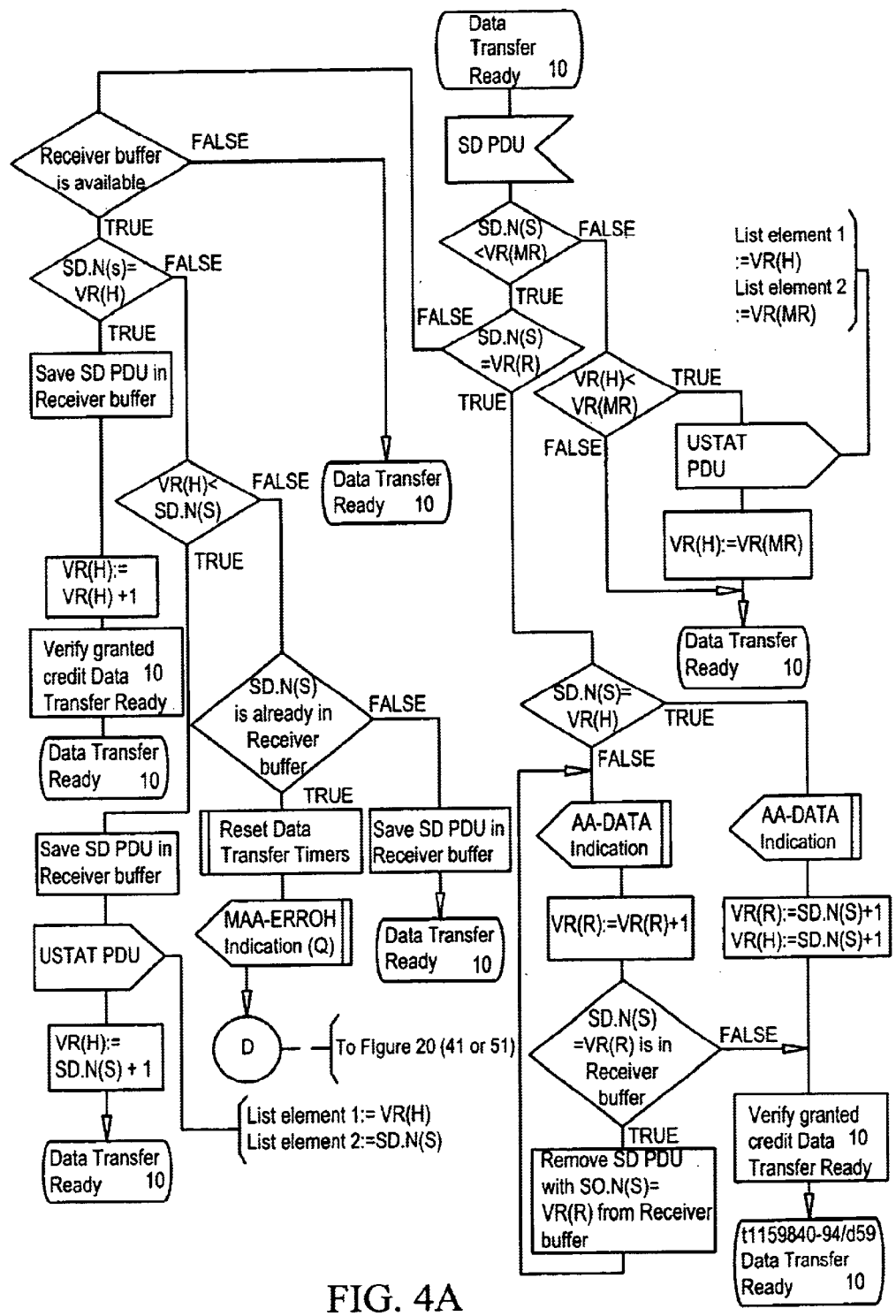
FIG. 4A shows modifications in the SSCOP that serve the purpose of calling the algorithm in FIG. 4B (said modifications are shaded dark).
Figure 4B:
FIG. 4B shows the algorithm called by said modifications in SDL form. According to this algorithm, credit is potentially withdrawn to the number of available buffers when the number of available buffers decreases too greatly or, respectively, credit is increased when the number of available buffers allows this and the credit that is still available has dropped below a specific threshold.
Figure 4C:
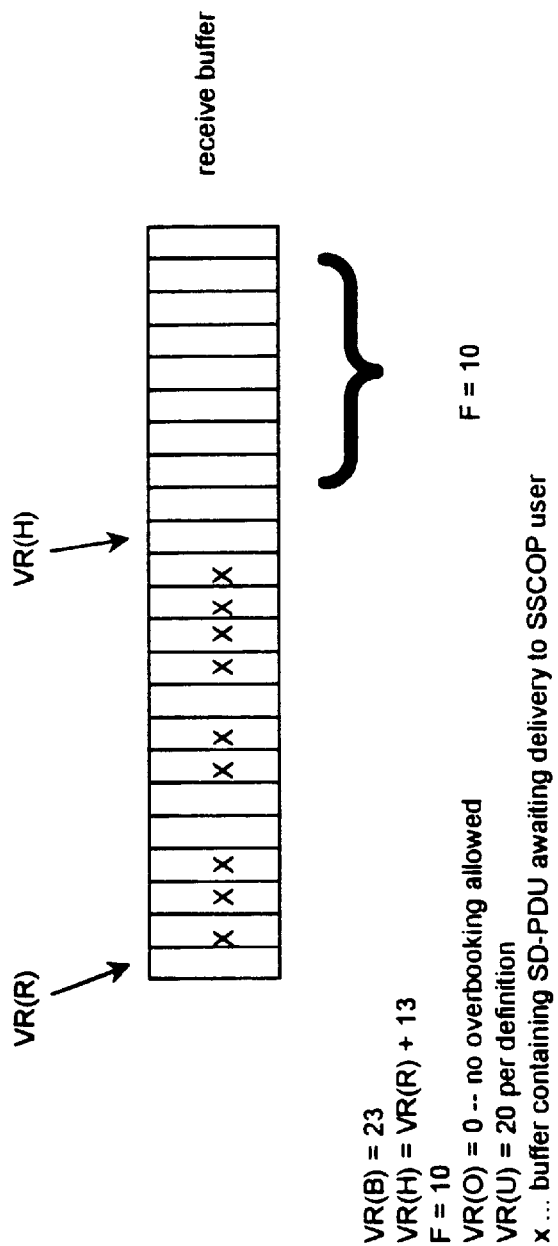

FIG. 4C shows an illustration of the algorithm according to FIG. 4B. VR(MR)=V(R)+23 applies in the example according to FIG. 4c. Let it then be assumed that the SD-PDU having the sequence number VR(R) was received, as a result whereof the gap is closed and 4 SD-PDUs being delivered to the SSCOP is triggered. F then receives the value 14 and NC=VR(H)+14=VR(R)+13+14>VR(R)+23. Since VR(MR)−VR(H)=VR(R)+23−VR(R)−13=10<VR(U) applies, an additional credit must be assigned.

Abbreviations Employed:

| | |
|---|---|
| N(MR) | PDU parameter |
| PDU | protocol data unit |
| POLL-PDU | PDU polling the receiver for a status report |
| SD-PDU | sequenced data PDU, transports data for the SSCOP user |
| STAT-PDU | PDU sending a status report, including a credit value, to the transmitter |
| VR(MR) | maximum receive state variable |
| VT(MS) | maximum send state variable |

What is claimed is:

1. A method for controlling a message flow in a communication network, in accord wherewith:

due to a request message for a new transmission window for an existing connection from a transmission station, a reception station sends an acknowledge message with a specification of the new transmission window to the transmitting station, the reception station sends a message with the specification of the new transmission window without a previous request message from the transmission station when the reception station determines a message loss, characterized in that the reception station, further, likewise sends the message with the specification of the new transmission window to the transmission station without the previous request message when the current capacity of a reception buffer of the reception station drops below a specific threshold and a plurality of payload messages that the transmission station is still allowed to send unacknowledged for a connection falls below a specific value.

2. The method according to claim 1, characterized in that, for communicating the new transmission window that is sent without the previous request message, the reception station uses the same message that is also used for acknowledging the request message.

3. The method according to claim 1, characterized in that the reception station dynamically determines a size of the new transmission window communicated in a corresponding message.

4. The method according to claim 1, characterized in that, after receiving the message that closes a gap in the reception buffer of the reception station, the reception station communicates another new transmission window to the transmission station.

5. The method according to claim 1, characterized in that the message flow is controlled by messages defined in ITU-T Recommendation Q.2110.

6. A reception station in a communication network that controls a message flow for connections to at least one transmission station in that it, a) due to a request message for a new transmission window for a connection from a transmission station, it sends an acknowledge message with a specification of the new transmission window to the transmitting station, b) also sends a message with the specification of the new transmission window to the transmission station without a prior request message from the transmission station when the reception station determines a message loss, characterized in that the reception station, further, likewise sends the message with the specification of the new transmission window to the transmission station without the prior request message when a current capacity of a reception buffer of the reception station drops below a specific threshold and a plurality of payload messages that the transmission station is still allowed to send unacknowledged for a connection falls below a specific value.

7. The reception station according to claim 6, characterized in that, for communicating the new transmission window that is sent without the prior request message, the reception station uses the same message that it also uses for acknowledging the request message.

8. The reception station according to claim 6, characterized in that the reception station can dynamically determine a size of the new transmission window communicated in a corresponding message.

9. The reception station according to claim 6, characterized in that, after receiving the message that closes a gap in the reception buffer, the reception station communicates another new transmission window to the transmission station.

10. The reception station according to claim 6, characterized in that it controls the message flow by messages defined in ITU-T Recommendation Q.2110.

* * * * *